United States Patent [19]

Fletcher et al.

[11] 4,061,427
[45] Dec. 6, 1977

[54] LASER EXTENSOMETER

[76] Inventors: James C. Fletcher, Administrator of the National Aeronautics and Space Administration, with respect to an invention of; Phillip J. Stocker, South Pasadena, Calif.; Harris L. Marcus, Austin, Tex.

[21] Appl. No.: 732,630

[22] Filed: Oct. 15, 1976

[51] Int. Cl.² .............................................. G01B 11/08
[52] U.S. Cl. ................... 356/159; 250/571; 356/160; 356/199
[58] Field of Search ............... 356/159, 160, 199, 200; 250/559, 560, 571, 572

[56] References Cited

U.S. PATENT DOCUMENTS

| | | | |
|---|---|---|---|
| 2,670,651 | 3/1954 | Burns et al. | 356/160 |
| 3,905,705 | 9/1975 | Petrohilos | 356/160 |
| 3,947,129 | 3/1976 | Wiklund | 356/159 |
| 4,021,119 | 5/1977 | Stauffer | 356/159 |

*Primary Examiner*—John K. Corbin
*Assistant Examiner*—R. A. Rosenberger
*Attorney, Agent, or Firm*—L. D. Wofford, Jr.; George J. Porter; John R. Manning

[57] ABSTRACT

A drift compensated and intensity averaged extensometer for measuring the diameter or other properties of a substantially cylindrical sample based upon the shadow of the sample. A beam of laser light is shaped to provide a beam with a uniform intensity along an axis normal to the sample. After passing the sample, the portion of the beam not striking said sample is divided by a beam splitter into a reference signal and a measurement signal. Both of these beams are then chopped by a light chopper to fall upon two photodiode detectors. The resulting AC currents are rectified and then divided into one another, with the final output being proportional to the size of the sample shadow.

14 Claims, 2 Drawing Figures

LASER EXTENSOMETER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF THE INVENTION

The present invention relates to a laser extensometer which is capable of measuring the cross-section of a sample, such as its diameter. This device can conduct this measurement without actually physically contacting said sample, and while said sample is moving.

BACKGROUND OF THE INVENTION

All laboratory light sources are, to some extent, nonuniform across their beam front, both in time and in space. Therefore, a light source imaged upon a screen exhibits both hot and cold spots which fade and brighten, semi-uniform gradations which fluctuate with time, and a general waxing and waning of overall intensity. In an incandescent lamp, the variations are due to asperities of the glass envelope, the shape and position of the filament, and time changes in the filament material such as oxidation or crystal growth. A laser suffers from defects in its optics, contaminants on its optical surfaces, and lasing fluctuations. While the degree of these problems varies over orders of magnitude, they are always present to some extent and must be considered if one is attempting to use a light source at its highest resolution.

If a light beam is used in such a way that a normalizing (i.e., reference) signal is obtained from one part of the beam front, and a measurement signal is obtained from another part, then there will be inherent errors in the normalized output due to the time and spatial variations alluded to above.

There are three ways around this problem. The first solution is to somehow homogenize the beam in time and space. The second solution is to obtain both the normalizing signal and the measurement signal from the same portion of the beam, and to alternate samplings at intervals much shorter than the time variations of the light source. The third solution is of course to just determine that the errors are below the required system accuracy.

Several U.S. patents exist in the field of utilizing radiant energy to inspect the diameter of a moving cylindrical object. One of these patents is U.S. Pat. No. 3,604,940 issued to David R. Matthews. As shown in FIG. 1, two highly collimated beams of light are directed tangentially along diametrically opposite surface portions of the object so as to be partially intercepted thereby. These partially intercepted beams are focused on two detectors and then compared to determine the size of the sample. Therefore, since two light beams are used, each signal would fluctuate differently with respect to time and space and errors in the readings would result. In addition, even though a beam splitter is used in FIG. 6 to determine the diameter of very small objects, two different light beams are still employed and, similarly, errors would result.

U.S. Pat. No. 3,856,412 issued to Carl A. Zanoni describes an electro-optical sensor for providing an output proportional to the cross-section of an object, such as the diameter of a cylinder which utilizes only a single beam of laser light. The diameter is determined by photoelectrically sensing when the laser beam is modulated on or off by the edge of the object, using the first and second derivatives of the output of the sensor. An auxiliary photoelectric output is obtained by passing a part of the scanning laser beam onto a sensor over a precision grading or scale with markings. This operation generates a modulated signal whose spatial frequency is independent of variations in the speed of scanning and intensity of the laser beam. Therefore, it can be seen that the Zanoni patent calculates the diameter of the signal using a time duration of the signal rather than the signal's intensity.

Therefore, a review of the prior art has failed to discover any patent or other reference which determines the diameter of a moving cylindrical object utilizing only a single beam of laser light with the measurement being based upon the shadow diameter of the sample.

SUMMARY OF THE INVENTION

The present invention overcomes the defects of the prior art by placing a cylindrical member, such as a thin wire or filament, whose dimension is to be measured in a beam of coherent, monochromatic light, the beam being obtained by oscillating a galvanometer mirror on which a laser beam is incident to produce a beam whose cross-section is oblong in a direction normal to the axis of the cylinder. Light that passes said cylindrical member is incident on a beam splitter having two channels.

In the first, or measurement channel, light passing the cylinder passes through a pair of knife edges and then into a photodetector after passing through a light chopper. The knife edges in this channel are spaced apart a distance slightly less than the beam height to block the outer periphery of the beam, allowing a pair of narrow bands of light to be incident on the detector. One edge of each band is established by a longitudinal edge of the member, and the other edge of each band is established by a knife edge.

Light passing through the second, or reference, channel of the beam splitter passes through two pairs of knife edges and into a second photodetector after passing through the light chopper. One set of knife edges is spaced apart a distance just larger than the dimension of the member, while the other set of knife edges is spaced apart a distance substantially equal to the distance between the knife edges in the first channel. As a consequence, two narrow bands of light pass into the second photodetector, such bands being slightly smaller than the bands passed into the first photodetector.

The AC outputs of the photodetectors are respectively rectified to establish a pair of DC signals which are divided one into the other to establish a normalized signal that is directly proportional to the size of the member and independent of laser intensity, detector dark current, and slight lateral motion of the member.

Other features and advantages of the invention will be apparent from the following description, the accompanying drawing and the appended claims.

DETAILED DESCRIPTION OF A PREFERRED EMBODIMENT

Figure 1:
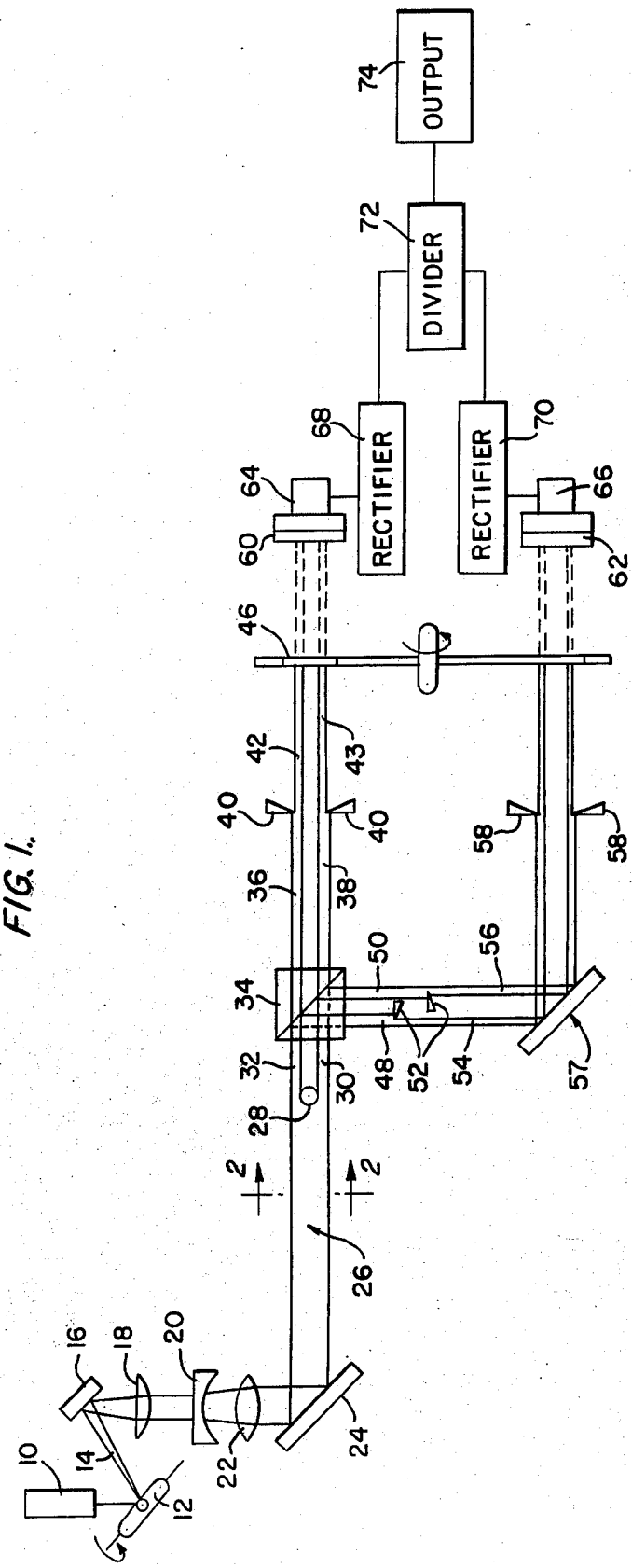
FIG. 1 is a schematic drawing of the laser extensometer according to the present invention.
Figure 2:
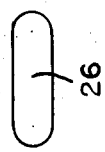
FIG. 2 is a cross-sectional view of the lasing beam taken through 2—2.

FIG. 1 is a schematic drawing of the laser extensometer according to the present invention. A beam of radiant energy produced by, for example, a helium-neon laser 10, is directed upon the mirror of a galvanometer 12 oscillating at approximately 25Khz. This galvanometer mirror 12 provides a beam of radiant energy 14 with a uniform intensity along its x-axis (i.e., normal to the sample axis). Beam 14 is reflected by mirror 16 and is then directed into an optics system including lenses 18, 20 and 22. Lens 18 collimates the beam along the x-axis, lens 20 diverges the beam along the x- and y-axis and lens 22 collimates the beam along both the x- and y-axis. Beam 26 now has an oblong cross-sectional area as shown in FIG. 2 and is then directed off of mirror 24 toward the sample 28.

After passing the sample, light beams 30 and 32 (the light which is neither reflected nor absorbed by the sample) are incident upon a beam splitter 34 having two channels. In the first channel, beams 36 and 38 pass through a pair of knife edges 40 such that the remainder of the beams 42 and 43 are only slightly wider than the sample shadow. These knife edges eliminate the non-uniform outer fringes of the laser beam. These beams control the sensitivity of the measurement.

Light beams 48 and 50 passing through the second channel of the beam splitter pass through knife edges 52 so that the sample shadow is no longer retained, forming beams 54 and 56. These beams provide a reference carrying only information of the beam intensity. This is necessary since lasers drift in intensity as much as 5%. The resulting beams 54 and 56 are reflected from mirror 57 and then are trimmed by a second pair of knife edges 58 to also eliminate the non-uniform outer fringes of the beams.

The beams of both channels are now chopped by a light chopper 46 at a frequency of approximately 500hz, pass through opal glass diffusers 60 and 62 respectively, and then fall upon two photodiode detectors 64 and 66. The AC current from the detectors is rectified by rectifiers 68 and 70, thus eliminating the dark current of the detectors, with the resultant DC signals being divided, one into the other by a divider 72. The final output signal is directly proportional to the size of the sample shadow, and is independent of laser intensity, detector dark current, and slight lateral motion of the sample. This final output can be exhibited by any standard output means 74, such as an oscilliscope.

While this device has been described with particular reference to the configuration shown in FIG. 1, said invention should not be construed to be so limited. For example, the source of radiant energy 10 need not be limited to a helium-neon laser, since many other laser producing devices may be utilized. Additionally, the particular optic system for collimating and diverging the beam of radiant energy need not be exactly the same as depicted in FIG. 1. It will also be obvious for those who possess ordinary skill in the art to make other changes and modifications to this device without departing from the scope of the invention.

What is claimed is:

1. A laser extensometer for measuring the cross-sectional dimension of a sample, comprising:
    a source of radiant energy for directing a beam of energy incident to the sample, the cross-sectional width of said beam being larger than the cross-sectional width of the sample;
    beam splitter means for dividing the radiant energy passing around the sample into a measurement and a reference beam of radiant energy, the sample located between said source of radiant energy and said beam splitter;
    first pair of blocking means spaced apart a distance larger than the dimensions of the sample, said blocking means disposed in the path of said reference beam and trimming said reference beam so that said reference beam carries only information of said reference beam intensity;
    means for receiving said reference and said measurement beams, and for producing an electrical signal for each of said beams;
    circuitry means for dividing said electrical signals into one another; and
    output means for displaying the resultant signal produced by said circuitry means, whereby said resultant signal is directly proportional to the size of the sample shadow.

2. A laser extensometer according to claim 1 additionally including shaping means for providing a beam of energy having uniform intensity normal to the sample axis, said means located between said source of radiant energy and the sample.

3. A laser extensometer according to claim 2 wherein said shaping means is an oscillating galvanometric mirror.

4. A laser extensometer according to claim 2 including an optic system located between said shaping means and the sample for shaping the radiant beam of energy.

5. A laser extensometer according to claim 1 further including a second pair of blocking means disposed in said measurement beam between said beam splitter and said receiving means, and a third pair of blocking means disposed in said reference beam between said beam splitter and said receiving means, both said second and third pairs of blocking means spaced apart a distance less than the height of said measurement and reference beams respectively, said second and third blocking means trimming said beams to eliminate non-uniform outer fringes.

6. A laser extensometer according to claim 5 wherein said first, second and third blocking means are knife edges.

7. A laser extensometer according to claim 1 further including a light chopper in the path of said measurement and reference beams between said beam splitter and receiving means.

8. A laser extensometer according to claim 1 wherein said means for receiving radiant energy are first and second photodetectors, said first photodetector receiving said reference beam and said second photodetector receiving said measurement beam.

9. A method for measuring the cross-sectional dimension of a sample, comprising the steps of:
    producing a coherent beam of radiant energy having a cross-sectional width larger than the cross-sectional width of the sample;
    directing said beam of energy toward the sample;
    splitting the energy beam passing around the sample into a measurement beam and a reference beam;
    trimming said reference signal so that said reference beam only contains information relating to said coherent beam intensity;

directing said measurement beam and said reference beam to photodetector means, thereby producing an electrical signal for each of said beams;

dividing said electrical signals into each other producing a resultant signal proportional to the size of the sample shadow; and observing said resultant on an output means.

10. A method according to claim 9 further including the step of positioning a shaping means between said beam of radiant energy and the sample for providing a beam of energy having uniform intensity normal to the sample axis.

11. A method according to claim 10 further including the step of placing an optic system between said galvanometric mirror and the sample for shaping the radiant beam of energy.

12. A method according to claim 9 further including the step of trimming said reference and measurement signals for eliminating non-uniform outer fringes.

13. A method according to claim 9 further including the step of chopping said reference and said measurement beams before said signals are directed into said photodetector means.

14. A method for measuring the cross-sectional dimension of a sample, comprising the steps of:

producing a coherent beam of radiant energy having a cross-sectional width larger than the cross-sectional width of the sample;

directing said beam of energy toward the sample;

splitting the energy beam passing around the sample into a measurement beam and a reference beam;

trimming said reference beam so that said reference beam only contains information relating to said coherent beam intensity;

directing said measurement beam and said reference beam to two separate photodetectors, thereby producing an electrical signal for each of said beams;

dividing said electrical signals into each other producing a resultant signal proportional to the size of the sample shadow; and observing said resultant on an output means.

* * * * *